3,325,470
WATER-INSOLUBLE MONOAZO DYESTUFFS
Joachim Ribka, Offenbach (Main), Germany, assignor to Farbwerke Hoechst Aktiengesellschaft vormals Meister Lucius & Bruning, Frankfurt am Main, Germany, a corporation of Germany
No Drawing. Filed Oct. 12, 1964, Ser. No. 403,346
Claims priority, application Germany, Oct. 16, 1963, F 40,998
5 Claims. (Cl. 260—193)

The present invention relates to new water-insoluble monoazo dyestuffs and to a process for preparing them; more particularly, the invention relates to dyestuffs of the general formula

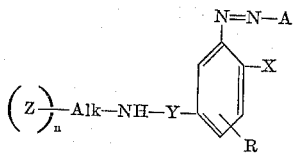

in which X represents a hydrogen or a halogen atom, an alkyl, alkoxy, aryloxy, alkylsulfone, arylsulfone, cyano or carboxylic acid ester group, R represents a hydrogen or a halogen atom or an alkoxy group, Y stands for a —SO$_2$— or —CO— group, Alk represents an alkylene or alkylidene radical, Z represents a substituted or unsubstituted carboxylic acid amide or sulfonic acid amide group, A represents the radical of a coupling component free from sulfonic acid and carboxylic acid groups and capable of coupling in a position adjacent to a hydroxyl group, and $n$ stands for 1 or 2.

I have now found that valuable water-insoluble monoazo dyestuffs can be prepared by coupling the diazonium compounds of amines of the general formula

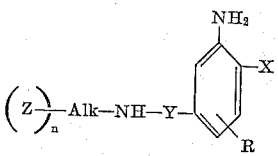

in which X represents a hydrogen or a halogen atom, an alkyl, alkoxy, aryloxy, alkylsulfone, arylsulfone, cyano or carboxylic acid ester group, R represents hydrogen, a halogen atom or an alkoxy group, Y stands for a —SO$_2$— or —CO— group, Alk represents an alkylene or alkylidene radical, Z represents a carboxylic acid amide or sulfonic acid amide group which may contain substituents and $n$ stands for 1 or 2, with coupling components free from sulfonic acid and carboxylic acid groups and capable of coupling in a position adjacent to a hydroxyl group.

The amines used as diazo components in the process of the present invention can be prepared generally by condensing a nitrobenzoic acid chloride or a nitrobenzene sulfonic acid chloride of the formula

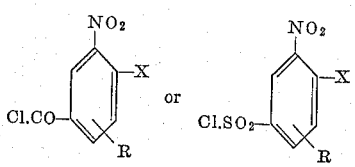

with aliphatic amines of the general formula

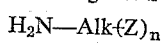

wherein X, R, Alk, Z and $n$ have the meanings indicated above, and subsequent reduction. They can, however, be also prepared by condensing an acetylamino-benzene sulfonic acid chloride of the formula

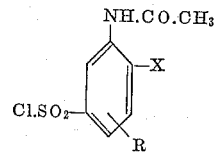

with the above mentioned aliphatic amines of the formula H$_2$N—Alk$(Z)_n$ and subsequent splititng off of the acetyl group.

The synthesis may be carried out as well by reacting the nitrobenzoic acid chlorides or nitrobenzene sulfonic acid chlorides mentioned above first with aliphatic amines of the general formula H$_2$N—Alk$(B)_n$, wherein B represents a carboxylic acid, sulfonic acid, carboxylic acid ester or sulfonic acid ester group and $n$ stands for 1 or 2, to form compounds of the general formulae

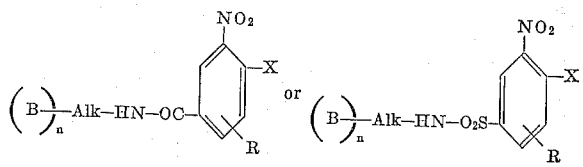

wherein X, R, Alk, B and $n$ have the meanings indicated above, by converting these compounds, in known manner, by means of ammonia, primary aliphatic amines or aromatic amines which may contain substituents into the corresponding sulfonic acid amides or carboxylic acid amides, and by subsequently reducing the nitro group. The aromatic amines used for the amidation may contain further carboxylic acid amide groups or sulfonic acid amide groups which usually improve the fastness of the dyestuffs to solvents.

As suitable aliphatic amines of the formulae

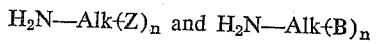

for the preparation of the diazo components there may be mentioned, for example, the following: amino-acetic acid, alanine, valine, leucine, glutamic acid, glutamine, aspartic acid, asparagine, 2-amino-ethane-carboxylic acid, 2-amino-ethane-sulfonic acid, 4-aminobutyric acid, 2- or 3-aminopropane-sulfonic acid, 2- or 4-aminobutane-sulfonic acid or 5-aminopentane-sulfonic acid or the esters or amides thereof.

The diazonium compounds are prepared in known manner. In some cases the diazonium compounds are difficultly soluble in an aqueous medium and are separated in the form of their salts. These salts can be isolated and coupled in the form of a moist paste. In these cases, it is advantageous to carry out the diazotization in an appropriate organic solvent, such as glacial acetic acid, acetone, dioxane, tetrahydrofurane, formamide, dimethylformamide or dimethylsulfoxide, and to combine the solution of the diazonium compound thus obtained with the coupling component.

As coupling components there are used in the process of the present invention compounds capable of coupling in a position adjacent to a hydroxyl group, for example aromatic or heterocyclic hydroxy compounds and compounds containing in an open carbon chain or in a heterocyclic ring an enolizable or enolized ketomethylene group. Compounds of this kind are, in particular, the arylamides of 2,3-hydroxynaphthoic acid and acetoacetic acid; the arylamide radical may contain at least one substituent which does not impart solubility in water, for example halogen atoms, alkyl, alkoxy, aryloxy, acylamino, arylsulfonylamino or alkylsulfonylamino groups. As further coupling components there may be mentioned, for example, derivatives of 5-pyrazolone, such as 1-aryl-3-methyl-5-pyrazolone, 1-aryl-5-pyrazolone-3-carboxylic acid ester or 1-aryl-5-pyrazolone-3-carboxylic acid amides, the aryl radical of which may contain the abovementioned substituents which do not impart solubility in water, as well as 2,4-dihydroxyquinoline or barbituric acid derivatives.

The dyestuffs are prepared by known methods by coupling the diazonium compounds with the coupling components in substance, on the fiber or on another substratum. When preparing the dyestuffs in substance the diazonium compounds are coupled with the coupling components, for example in an aqueous medium, advantageously in the presence of a non-ionic, anion-active or cation-active dispersing agent or in the presence of an organic solvent such as pyridine, quinoline or dimethylformamide. When carrying out the coupling in an aqueous medium it is advantageous, in order to obtain the optimal grain condition of the pigments, to heat the coupling mixture for some time, for example at the boil, while adding small amounts of an organic solvent, for example pyridine, a hydrocarbon, such as dichlorobenzene, a phthalic acid dialkylester or resin soap.

In order to obtain particularly clear and fast dyeings it is advantageous to purify the dyestuffs prepared by coupling in substance, for example, by stirring them thoroughly for some time, if desired in the heat, with pyridine, dimethylformamide or another suitable organic solvent. In some cases it is advisable to grind the crude pigment with an appropriate grinding auxiliary agent in order to convert it into a finely divided form.

The preparation of the dyestuffs by coupling on fibers of natural or synthetic origin, as for example cotton, regenerated cellulose, polyvinylalcohol fibers, acetate rayon or polyamide fibers is effected according to the dyeing and printing processes applied in the ice color technique.

The coupling may as well be effected on another substratum, for example on barite.

The dyestuffs prepared by coupling in substance are water-insoluble pigments. The dyeings prepared with the use of these pigments are distinguished by a good fastness to light and to solvents. The dyestuffs are suitable for dyeing and printing textile materials made from vegetable or animal fibers, such as wool, cotton or linen, those made from semi-synthetic fibers, such as regenerated cellulose, for example rayon or viscose, or those made from synthetic fibers, such as polycondensation, polymerisation or polyaddition compounds, according to the usual pigment dyeing and printing processes. The dyestuffs may also be added to spinning solutions, if desired before the polycondensation or polymerisation. Moreover, they are suitable for coloring or printing paper and cardboard as well as for coloring paper pulps, lacquers and films of various composition, for example those made from cellulose acetate, cellulose propionate or cellulose butyrate, nitrocellulose, polyvinyl chloride, copolymers of vinylchloride, as well as polyethylene, polypropylene, polyamides, polyacrylonitrile or the copolymerisates thereof, polyesters or alkyd resins.

Moreover, the new dyestuffs are suitable for coloring natural or synthetic resins, for example epoxy resins, polyester resins, vinyl resins, polystyrene resins, alkyd resins or aldehyde resins, such as products obtained by condensation of phenol, urea or melamine and formaldehyde, for coloring emulsions of synthetic resins, as for example oil-in-water emulsions or water-in-oil emulsions, furthermore natural rubber-like materials such as caoutchouc or gutta-percha and synthetic vulcanizable materials, as for example polychloroprene, olefinic polysulfides, polybutadiene or copolymers of butadiene and styrene or of butadiene and acrylonitrile.

The following examples serve to illustrate the invention but they are not intended to limit it thereto, the parts being by weight unless otherwise mentioned.

*Example 1*

12.15 parts of N-(3'-amino-4'-methylbenzenesulfonyl)-aminoacetic acid amide are mixed by stirring with 100 parts by volume of water and 25 parts by volume of a 5 N hydrochloric acid, whereby the hydrochloride of the base is formed. The product is then diazotized by means of 10 parts by volume of a 5 N sodium nitrite solution. A solution of the diazonium compound is obtained which is clarified by means of kieselguhr. Simultaneously with a clarified aqueous solution which has been made alkaline by means of sodium hydroxide of 18 parts of 1-(2',3'-hydroxynaphthoylamino) - 2,5 - dimethoxy-4-chlorobenzene this solution is introduced, with stirring, during 30 to 40 minutes, into a mixture of 200 parts by volume of water, 1 part of a product obtained by the action of 20 mols of ethylene oxide on 1 mol of oleyl alcohol and 6 parts of glacial acetic acid. The whole is stirred until the coupling is complete and then heated to the boil for a short period.

The dyestuff formed is filtered with suction, washed, dried, ground and then mixed by stirring for 1 hour at 80° C. with 300 parts of dimethylformamide. The mixture is then poured into water, the dyestuff is filtered with suction, washed thoroughly with water and dried. When incorporated into polyvinyl chloride, a lacquer, a printing paste or a spinning solution the dyestuff obtained in the manner described, which corresponds to the following formula

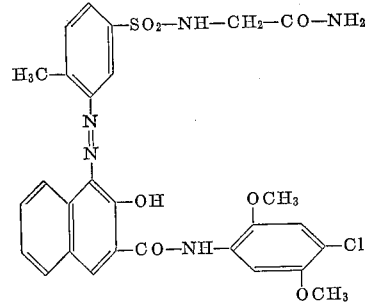

produces bluish red dyeings or prints which have a good fastness to light and to solvents.

*Example 2*

12.15 parts of N-(3'-amino-4'-methylbenzene-sulfonyl) aminoacetic acid amide are diazotized as described in Example 1. The clarified diazo solution is introduced, at 18° C., into an aqueous suspension of 15 parts of 1-acetoacetylamino - 2,5 - dimethoxy - 4 - chlorobenzene which has been prepared by dissolving 1-acetoacetyl-amino-2,5-dimethoxy-4-chlorobenzene in a dilute sodium hydroxide solution and precipitating with glacial acetic acid in the presence of a product obtained by the action of about 20 mols of ethylene oxide on 1 mol of octadecyl alcohol. During the coupling the pH-value of the mixture is kept at 6 by continuous addition of a disodium phosphate solution. When the coupling is complete, 2 parts of resin soap are added, the mixture is then brought to the boil, the dyestuff is filtered with suction, washed, pulverized and subsequently mixed by stirring for 1 hour at 70°–80° C. with 300 parts of glacial acetic acid. The whole is then poured into water, the dyestuff is filtered with suction, washed and dried.

When incorporated into polyvinyl chloride or other synthetic resins, a lacquer, a printing paste or a spinning solution, the pigment dyestuff thus obtained, which corresponds to the following formula

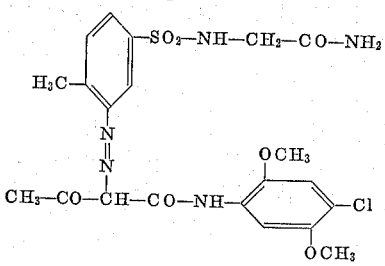

produces greenish yellow dyeings or prints which have a good fastness to light and to solvents.

Example 3

22.4 parts of N-(3'amino-4'-methoxybenzoyl)-aminoacetic acid amide are dissolved in 150 parts by volume of water and 50 parts by volume of 5 N hydrochloric acid and diazotized, at 10° C., with 20 parts by volume of 5 N sodium nitrite solution. During about 30 minutes the clarified diazonium solution is introduced, at 25°–30° C., into a solution of 37 parts of 1-(2',3'-hydroxynaphthoylamino)-2,4-dimethoxy-5-chlorobenzene in 800 parts by volume of pyridine. When the coupling is complete the dyestuff is filtered with suction, washed thoroughly with hot water and dried. When incorporated in polyvinyl chloride or another synthetic resin, a lacquer, a printing paste or a spinning solution, the pigment dyestuff obtained, which corresponds to the following formula

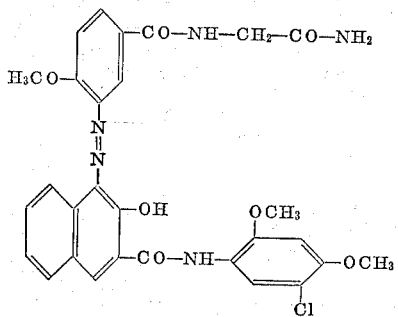

yields carmine red dyeings or prints having a good fastness to solvents.

Example 4

31.2 parts of N-(3'-amino-4'-(4'' - chloro) - phenoxybenzoyl)-aminoacetic acid amide are mixed by stirring for about 30 minutes with 50 parts by volume of 5 N hydrochloric acid and 200 parts by volume of water and subsequently diazotized with 20 parts by volume of a 5 N sodium nitrite solution. The clarified diazo solution is introduced into the vessel designed for the coupling, 4 parts by volume of glacial acetic acid and an aqueous solution of 2 parts of a product obtained by the action of about 20 mols of ethylene oxide on 1 mol of octadecyl alcohol are added and within about 30 minutes a clarified solution of 31 parts of 1-(2',3'-hydroxynaphthoylamino)-4-methoxybenzene in 280 parts by volume of water and 40 parts by volume of a 5 N sodium hydroxide solution are introduced at room temperature. The whole is stirred at 50° C. until the coupling is complete, an aqueous solution of 5 parts of resin soap and 3 parts of calcium chloride are added and the whole is kept at the boil for another hour. Subsequently, the dyestuff is washed and dried.

When incorporated in polyvinylchloride or other resins, a lacquer, a printing paste or a spinning solution, the pigment dyestuff obtained, which corresponds to the following formula

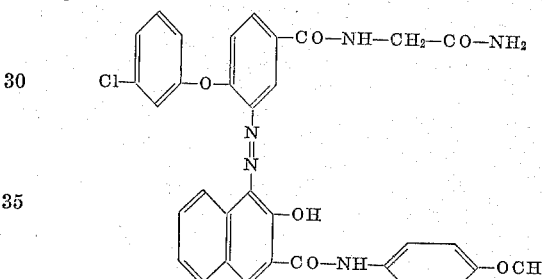

produces bluish red dyeings and prints which have good fastness properties.

The following table contains a number of further components suitable for use in the process of the present invention as well as the tints of the graphic prints prepared with the dyestuffs which are obtained in substance.

| Diazo Component | Coupling Component | Tint |
| --- | --- | --- |
| N-(3'-amino-4'-methylbenzoyl)-aminoacetic acid amide | 1-(2',3'-hydroxynaphthoylamino)-2,4-dimethoxy-5-chlorobenzene. | Bluish red. |
| Do | 1-(2',3'-hydroxynaphthoylamino)-2,5-dimethoxy-4-chlorobenzene. | Do. |
| Do | 1-(2',3'-hydroxynaphthoylamino)-4-methoxybenzene | Do. |
| Do | 1-acetoacetylamino-2,5-dimethoxy-4-chlorobenzene | Greenish yellow. |
| N-(3'-amino-4'-chlorobenzoyl)-aminoacetic acid amide | 1-(2',3'-hydroxynaphthoylamino)-4-methoxybenzene | Yellowish red. |
| Do | 1-(2',3'-hydroxynaphthoylamino)-4-acetylaminobenzene | Do. |
| Do | 1-(2',3'-hydroxynaphthoylamino)-4-benzoylaminobenzene | Do. |
| N-(3'-amino-4'-(4''-chloro)-phenoxy-benzoyl)-aminoacetic acid amide. | 1-(2',3'-hydroxynaphthoylamino)-4-ethoxybenzene | Bluish red. |
| Do | 1-(2',3'-hydroxynaphthoylamino)-2,4-dimethoxy-5-chlorobenzene. | Do. |
| Do | 1-(2',3'-hydroxynaphthoylamino)-2,5-dimethoxy-4-chlorobenzene. | Do. |
| N-(3'-amino-4'-chlorobenzene-sulfonyl)-aminoacetic acid amide | 1-acetoacetylamino-2,5-dimethoxy-4-chlorobenzene | Greenish yellow. |
| Do | 1-(2',3'-hydroxynaphthoylamino)-4-methoxybenzene | Orange. |
| N-(3'-amino-4'-methylbenzene-sulfonyl)-aminoacetic acid amide | 1-(2',3'-hydroxynaphthoylamino)-2,5-dimethoxy-4-chlorobenzene. | Brownish red. |
| N-(3'-amino-4'-methoxybenzoyl)-2-aminoethanesulfonic acid amide. | 1-(2',3'-hydroxynaphthoylamino)-4-methoxybenzene | Red. |
| N-(3'-amino-4'-methoxybenzoyl)-2-aminoethanesulfonic acid amide-(2''-chloro)-phenylamide. | 1-(2',3'-hydroxynaphthoylamino)-2,4-dimethoxy-5-chlorobenzene. | Carmine red. |
| N-(3'-amino-4'-carbomethoxybenzoyl)-aminoacetic acid amide | 1-(2',3'-hydroxynaphthoylamino)-2,5-dimethoxy-4-chlorobenzene. | Do. |
| N-(3'-aminobenzoyl)-aminoacetic acid-(4''-carbamyl)-phenylamide. | 1-(2',3'-hydroxynaphthoylamino)-4-methoxybenzene | Red. |
| N-(3'-amino-4'-methoxybenzoyl)-aminoacetic acid-(4''-acetylamino)-phenylamide. | 1-(2',3'-hydroxynaphthoylamino)-2,5-dimethoxy-4-chlorobenzene. | Red. |
| N-(3'-amino-4'-methylbenzoyl)-aminoacetic acid-(4''-sulfamyl)-phenylamide. | 1-(2',3'-hydroxynaphthoylamino)-2,4-dimethoxy-5-chlorobenzene. | Carmine red. |
| N-(3'-amino-4'-methylbenzoyl)-aminoacetic acid-(4''-sulfamyl)-phenylamide. | 1-(2',3'-hydroxynaphthoylamino)-4-methoxybenzene | Bluish red. |
| N-(3'-amino-4'-methylbenzene-sulfonyl)-aminoacetic acid-(4''-carbamyl)-phenylamide. | 1-phenyl-3-methyl-5-pyrazolone | Reddish yellow. |
| N-(3'-amino-4'-methylbenzene-sulfonyl)-aminoacetic acid amide | 1-(2',3'-hydroxynaphthoylamino)-4-methoxybenzene | Red. |
| N-(3'-amino-4'-methoxybenzene-sulfonyl)-aminoacetic acid amide. | 1-(2',3'-hydroxynaphthoylamino)-2,4-dimethoxy-5-chlorobenzene. | Red. |
| Do | do | Bluish red. |
| N-(3'-amino-4'-chlorobenzene-sulfonyl)-aminoacetic acid amide | 1-(2',3'-hydroxynaphthoylamino)-2,5-dimethoxy-4-chlorobenzene. | Do. |
| Do | 1-(2',3'-hydroxynaphthoylamino)-4-methoxybenzene | Yellowish red. |
| | 2-(2',3'-hydroxynaphthoylamino)-naphthalene | Red. |

Example 5

A cotton yarn is treated for 45 minutes at 35° C. in the impregnating bath described below, with a ratio of goods to liquor of 1:20, centrifuged and developed during 30 minutes at 20° C. in the developing bath described below. The material is then rinsed with a solution containing per liter of water 3 cc. of hydrochloric acid of 20° Bé., then soaped first for 15 minutes at 60° C. and then for another 15 minutes at 95° C. with a solution containing per liter of water 1 g. of a product obtained by the action of about 10 mols of ethylene oxide on 1 mol of isododecyl-phenol and 3 g. of soda ash, rinsed and dried. A red dyeing is obtained having good fastness properties to light and to wetting.

*Impregnating bath.*—4.3 g. of 1 - (2',3' - hydroxynaphthoylamino)-2,4-dimethoxy-5-chlorobenzene are dissolved in 13.5 cc. of denaturated ethyl alcohol, 1.5 cc. of a sodium hydroxide solution of 38° Bé., 4.5 cc. of water of 40° C. and 1.5 cc. of a 33% formaldehyde solution. The solution obtained is made up to 1 liter by means of water of 35° C., 3 g. of a product obtained by condensation of high-molecular weight fatty acids and protein decomposition products and 10 cc. of a sodium hydroxide solution of 38° Bé.

*Developing bath.*—3.7 g. of N-(3'-amino-4-methoxybenzoyl) - amino - acetic acid-(2'',5''-dichloro)-phenylamide are diazotized with 4 cc. of hydrochloric acid of 20° Bé. and 4 cc. of a 20% sodium nitrite solution and the diazo solution obtained in this manner is introduced into a bath containing per liter of water 1 g. of a product obtained by the action of about 20 mols of ethylene oxide on 1 mol of octadecyl alcohol, 1.5 g. of mono-sodium phosphate, 5.5 g. of disodium phosphate and 20 g. of sodium chloride.

The following table indicates a number of further components suitable for use in the process of the present invention as well as the tints obtained with the dyestuffs prepared on the fiber.

I claim:
1. Water-insoluble monoazo dyestuffs of the formula

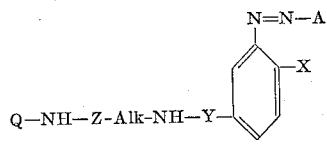

wherein X represents hydrogen, chlorine, methyl, methoxy, carbomethoxy or chlorophenoxy, Y and Z represent independently —SO$_2$— or —CO—, Alk represents —CH$_2$— or —CH$_2$—CH$_2$—, Q represents hydrogen, lower alkyl, phenyl or substituted phenyl wherein the substituents are at least one member selected from the group consisting of chlorine, methyl, methoxy, acetylamino, sulfamyl and carbamyl and A represents the radical of a 2,3-hydroxynaphthoic acid arylamide, an aceto acetic acid arylamide or a 1-phenyl-3-methyl-5-pyrazolone.

2. The monoazo dyestuff of the formula

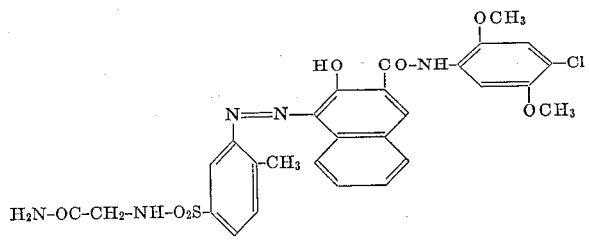

| Diazo Component | Coupling Component | Tint |
|---|---|---|
| N-(3'-amino-4'-methylbenzoyl)-aminoacetic acid phenylamide | 2-(2',3'-hydroxynaphthoylamino)-3-methoxy-diphenylene oxide. | Bluish red. |
| Do | 1-(2',3'-hydroxynaphthoylamino)-4-methoxybenzene | Scarlet. |
| N-(3'-amino-4'-methylbenzoyl)-aminoacetic acid-(2''-chloro)-phenylamide. | 2-(2',3'-hydroxynaphthoylamino)-naphthalene | Red. |
| N-(3'-amino-4'-methylbenzoyl)-aminoacetic acid-(2''-methyl-3''-chloro)-phenylamide. | 1-(2',3'-hydroxynaphthoylamino)-4-ethoxybenzene | Yellowish red. |
| N-(3'-amino-4'-methoxybenzoyl)-aminoacetic acid-(2'',5''-dichloro)-phenylamide. | 1-(2',3'-hydroxynaphthoylamino)-2,5-dimethoxy-4-chloro-benzene. | Carmine red. |
| N-(3'-amino-4'-methoxybenzoyl)-aminoacetic acid-(4''-methoxy)-phenylamide. | 1-(2',3'-hydroxynaphthoylamino)-2-methyl-4-methoxy-benzene. | Do. |
| N-(3'-amino-4'-(4''-chloro)-phenoxy-benzoyl)-aminoacetic acid monoethyl amide. | 1-(2',3'-hydroxynaphthoylamino)-4-methoxybenzene | Bluish red. |
| N-(3'-amino-4'-chlorobenzoyl)-aminoacetic acid-(2''-methyl-5''-chloro)-phenyl amide. | 1-(2',3'-hydroxynaphthoylamino)-2-methoxybenzene | Yellowish red. |
| Do | 1-(2',3'-hydroxynaphthoylamino)-2-methylbenzene | Do. |
| N-(3'-amino-4'-methylbenzene-sulfonyl)-aminoacetic acid amide | 1-(2',3'-hydroxynaphthoylamino)-2,4-dimethoxy-5-chloro-benzene. | Red. |
| N-(3'-amino-4'-methoxybenzene-sulfonyl)-aminoacetic acid amide. | do | Bluish red. |
| N-(3'-amino-4'-methoxybenzene-sulfonyl)-aminoacetic acid amide. | 1-(2',3'-hydroxynaphthoylamino)-2,5-dimethoxy-4-chloro-benzene. | Do. |
| N-(3'-amino-4'-chlorobenzene-sulfonyl)-aminoacetic acid amide | 1-(2',3'-hydroxynaphthoylamino)-4-methoxybenzene | Yellowish red. |
| Do | 2-(2',3'-hydroxynaphthoylamino)-naphthalene | Red. |

3. The monoazo dyestuff of the formula

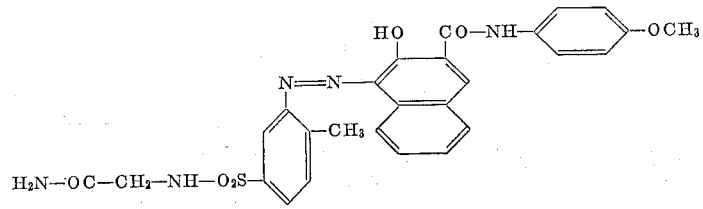

4. The monoazo dyestuff of the formula
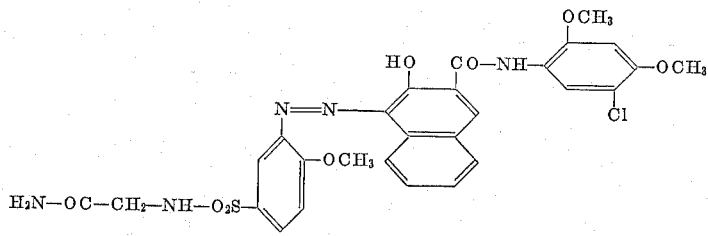
5. The monoazo dyestuff of the formula
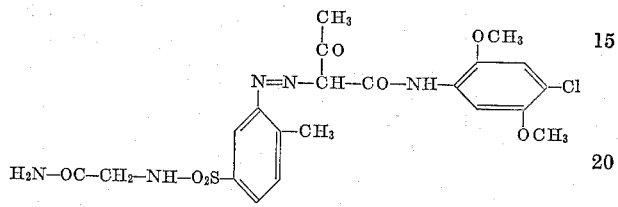
References Cited
UNITED STATES PATENTS
2,816,101   12/1957   Breig et al. _____ 260—163
CHARLES B. PARKER, *Primary Examiner.*
DONALD M. PAPUGA, *Assistant Examiner.*